United States Patent [19]

Handke et al.

[11] Patent Number: 5,501,438

[45] Date of Patent: Mar. 26, 1996

[54] MOTOR VEHICLE VIBRATION DAMPER

[75] Inventors: Günther Handke, Euerbach, Germany;
Edward W. Silye, Macomb, Mich.;
Toivo Raabis, Dearborn Heights, Mich.;
Thomas Achard, Troy, Mich.;
Matthias Raulf, Rochester Hills, Mich.

[73] Assignee: Fichtel & Sachs AG, Schweinfurt, Germany

[21] Appl. No.: 289,626

[22] Filed: Aug. 12, 1994

[30] Foreign Application Priority Data

Aug. 14, 1993 [DE] Germany .......................... 43 27 439.0
Mar. 12, 1994 [DE] Germany .......................... 44 08 405.6

[51] Int. Cl.⁶ .................................................. B60G 15/10
[52] U.S. Cl. .......................................... 267/226; 267/221
[58] Field of Search .................................. 188/282, 284,
188/286, 315, 318, 322.11, 322.16, 322.17,
299; 267/64.11, 64.15, 34, 202, 204, 205,
207, 209, 211, 216, 221, 226

[56] References Cited

U.S. PATENT DOCUMENTS

| | | | |
|---|---|---|---|
| 3,833,248 | 9/1974 | Wossner et al. | 188/282 |
| 4,328,960 | 5/1982 | Handke et al. | 267/34 |
| 4,345,748 | 8/1982 | Wössner et al. | 188/322.17 |
| 4,482,036 | 11/1984 | Wossner et al. | 188/322.17 |
| 4,653,618 | 3/1987 | Churchill et al. | 188/322.17 |
| 4,852,862 | 8/1989 | Bauer et al. | 188/322.17 |
| 5,368,141 | 11/1994 | Clarke | 188/282 |
| 5,398,787 | 3/1995 | Wossner et al. | 188/299 |

Primary Examiner—Robert J. Oberleitner
Assistant Examiner—Chris Schwartz
Attorney, Agent, or Firm—Nils H. Ljungman & Associates

[57] ABSTRACT

A motor vehicle vibration damper having a piston disposed on a piston rod within a cylinder of the damper unit, is provided with a mechanical limit-stop for resisting and limiting movement of the piston rod out of the cylinder. The limit stop can preferably comprise a spring disposed about the piston rod, which spring can have a stop member connected to each end thereof in a reclosable manner. The stop members can comprise a guide surface for guiding movement of the piston rod within the limit stop, and the limit stop, comprising the spring and stop members, can be disposed within the cylinder, about the piston rod, in a free-floating manner.

16 Claims, 4 Drawing Sheets

MOTOR VEHICLE VIBRATION DAMPER

BACKGROUND OF THE INVENTION

1. Field of the Invention

This invention relates generally to a vibration absorber, damper, or telescoping strut for a motor vehicle, which damper, or strut, can have a mechanical device, or tension limit stop, for limiting movement of a piston rod within a cylinder thereof. In general, such a vibration damper can have a cylinder in which a piston, having damping devices and being connected to a piston rod, can be moved axially. The piston can typically divide the interior of the cylinder into two fluid-filled work chambers, one of which chambers can have a generally ring-shaped cross-section as defined between the interior of the cylinder wall and the piston rod. At one end of the cylinder there can generally be a guide and a seal for the piston rod. The hydraulic-mechanical tension limit stop, which can be located in the ring-shaped work chamber between the cylinder and the piston rod, can have a limit stop connected to the piston rod, and a spring which can contact, on one hand, the piston rod guide, and on the other hand, the limit stop.

2. Background Information

German Laid Open Patent Application No. 28 53 914, which corresponds to U.S. Pat. No. 4,345,748, discloses a mechanical limit stop for a vibration absorber or a telescoping strut which, among other things, has a spring which is located in the annular chamber between the piston rod and the cylinder. With this arrangement, after the piston rod has travelled a specified telescoping distance out of the cylinder, the spring comes into contact with a stop surface on the piston rod. In the embodiments illustrated therein, the spring, at its upper end, is centered in the vicinity of the piston rod guide on the inside diameter of the cylinder tube and, at its bottom end, is centered by the bottom end of the piston rod. The direct contact between the spring and the above-mentioned vibration absorber components during assembly and/or during operation of the absorber causes abrasion on the surfaces of the piston rod or on the cylinder tube, with the consequence that small chips can be formed which can have an adverse effect on the function of the vibration absorbers.

The embodiments illustrated in FIGS. 3 and 4 of German Laid Open Patent Application No. 28 53 914, and U.S. Pat. No. 4,345,748, have, on their lower end, a damping ring, which is intended to achieve a centering in relation to the piston rod by means of guide cams. But there are problems in making the connection between the spring and the molded-on damping ring., such that it is extremely difficult to guarantee reliable operation of the hydraulic-mechanical tension limit stop for the entire life of the device. For reasons relating to manufacturing technology, it is also essentially very difficult to mold around the spring, which means that the dimensional stability of the guide cams becomes imprecise. Consequently, the spring can scrape against the piston rod. Furthermore, on account of the particular type of connection between the spring and the damping ring, several coils of the spring are often embedded in the ring, and these embedded coils are thus essentially unavailable for the suspension process. Large stresses generally also occur inside the sleeve of the damping ring, which stresses threaten the connection to the spring.

An additional problem is the requirement for a simple but reliable suspension. With known devices, it can very often be a complex, time-consuming and expensive operation to reliably locate the upper end of the spring directly underneath the piston rod guide.

OBJECT OF THE INVENTION

The object of the present invention is to employ extremely simple means to solve the above-mentioned problems which are common with known damping arrangements.

SUMMARY OF THE INVENTION

According to the present invention, this object can be achieved by a vibration damper which has a limit stop, which limit stop, in at least one embodiment of the invention, preferably has a sleeve and a flange. Preferably the limit stop is connected in a reclosable manner with the spring. In another embodiment of the present invention, the limit stop can have its sleeve configured with at least one radial guide surface for the piston rod on its inside diameter.

The simple geometry of the limit stops in accordance with the present invention makes economical mass production possible. Likewise, on account of the reclosable connection between the limit stop and the spring, manufacture of the limit stop/spring component by robots becomes possible. The radial guide surface of the limit stop can essentially ensure that there will be substantially no direct contact between the spring and the piston rod. In another variant embodiment, it can be appropriate to preferably have a limit stop at both ends of the spring, so that the component, having the upper limit stop, the spring, and the lower limit stop, can be preassembled outside the damper, and inserted into the vibration absorber as a single unit during manufacture. Subsequently, during operation, there would then be a floating mounting of the mechanical tension limit stop within the cylinder of the damper or strut.

In accordance with an additional advantageous feature of at least one other embodiment of the present invention, the limit stop can be made of plastic. This configuration can take advantage of the favorable coefficient of friction between plastic and the surface of the piston rod. It has also been found that there is essentially no need for a polytetrafluoroethylene (PTFE or TEFLON) coating, which requires close tolerances.

In one advantageous variant embodiment of the present invention, the sleeve can be provided with an undercut, into which undercut at least one terminal coil of the spring can be engaged. While more than one coil could be engaged, it can be preferable that only one coil be engaged in the undercut to maximize the spring length available for the stop mechanism.

The undercut connection as described above produces a positive connection, the connection being designed so that it can reliably absorb the dead weight of the spring and of an additional limit stop. Alternatively, in another variant embodiment of the present invention, it can be possible to have the sleeve force-fitted, by apparatus of its outside diameter, with the spring. In both variants, only one terminal coil can be required for the connection to the sleeve, so that there can preferably be no losses of the spring coils which actually perform the suspension action.

To substantially minimize sliding contact with the cylinder, in any case, the various embodiments of the present invention teach, on the one hand, that the outside diameters of the flanges of the sleeve and the spring are smaller than the inside diameter of the cylinder.

On relatively soft and long springs, kinks can often occur in the spring during the suspension process. But these kinks essentially cannot lead to contact between the piston rod and the spring, since the axial length of the sleeve is several times that of a spring coil of the spring.

In summary, one aspect of the invention resides broadly in a vibration damper for motor vehicles, such as automobiles, the vibration damper having a longitudinal dimension, and the vibration damper comprising: tubular member apparatus, the tubular member apparatus having a first end and a second end, and the tubular member apparatus comprising apparatus for attaching the tubular member apparatus to one of: a wheel suspension of the motor vehicle and a support structure of the motor vehicle; the tubular member apparatus defining a chamber therewithin, the chamber containing damping fluid therewithin; piston apparatus disposed within the chamber and dividing the chamber into first and second chamber portions; the piston apparatus comprising apparatus for controlling flow of damping fluid between the first and second chamber portions; piston rod apparatus projecting through the first end of the tubular member apparatus, the piston rod apparatus being movable axially within the tubular member apparatus in a direction along the longitudinal dimension of the vibration damper; the piston rod apparatus having a first end connected to the piston apparatus for movement of the piston apparatus along with the piston rod apparatus; the piston rod apparatus having a second end projecting out of the tubular member apparatus through the first end of the tubular member apparatus, the second end of the piston rod apparatus comprising apparatus for attaching the piston rod apparatus to the other of: the wheel suspension of the motor vehicle and the support structure of the motor vehicle; the first end of the tubular member apparatus comprising guide apparatus for guiding movement of the piston rod apparatus during the axial movement of the piston rod apparatus; the guide apparatus comprising apparatus for at least partially closing the first end of the first and second tubular members; the piston rod apparatus and the tubular member apparatus defining an annular space therebetween; resilient member apparatus disposed within the annular space for at least damping movement of the first end of the piston rod apparatus in a direction towards the guide apparatus; the resilient member apparatus having a first end disposed towards the guide apparatus and a second end disposed towards the piston apparatus; each of the first and second ends of the resilient member apparatus comprising bearing members for respectively contacting the guide apparatus and the piston apparatus and bearing against the guide apparatus and the piston apparatus during compression of the resilient member apparatus between the guide apparatus and the piston apparatus; and each of the bearing members being mounted to the first and second ends of the resilient member apparatus in a selectively detachable manner.

Another aspect of the invention resides broadly in a vibration damper for motor vehicles, such as automobiles, the vibration damper having a longitudinal dimension, and the vibration damper comprising: tubular member apparatus, the tubular member apparatus having a first end and a second end, and the tubular member apparatus comprising apparatus for attaching the tubular member apparatus to one of: a wheel suspension of the motor vehicle and a support structure of the motor vehicle; the tubular member apparatus defining a chamber therewithin, the chamber containing damping fluid therewithin; piston apparatus disposed within the chamber and dividing the chamber into first and second chamber portions; the piston apparatus comprising apparatus for controlling flow of damping fluid between the first and second chamber portions; piston rod apparatus projecting through the first end of the tubular member apparatus, the piston rod apparatus being movable axially within the tubular member apparatus in a direction along the longitudinal dimension of the vibration damper; the piston rod apparatus having a first end connected to the piston apparatus for movement of the piston apparatus along with the piston rod apparatus; the piston rod apparatus having a second end projecting out of the tubular member apparatus through the first end of the tubular member apparatus, the second end of the piston rod apparatus comprising apparatus for attaching the piston rod apparatus to the other of: the wheel suspension of the motor vehicle and the support structure of the motor vehicle; the first end of the tubular member apparatus comprising guide member apparatus for guiding movement of the piston rod apparatus during the axial movement of the piston rod apparatus; the guide member apparatus comprising apparatus for at least partially closing the first end of the first and second tubular members; the piston rod apparatus and the tubular member apparatus defining an annular space therebetween; resilient member apparatus disposed within the annular space for at least damping movement of the first end of the piston rod apparatus in a direction towards the guide member apparatus; the resilient member apparatus having a first end disposed towards the guide member apparatus and a second end disposed towards the piston apparatus; each of the first and second ends of the resilient member apparatus comprising guide apparatus for guiding relative movement between the resilient member apparatus and the piston rod; and each of the guide apparatus comprising at least one guide surface disposed adjacent the piston rod.

BRIEF DESCRIPTION OF THE DRAWINGS

The present invention is explained below in greater detail with reference to the accompanying drawings, in which.

DESCRIPTION OF THE PREFERRED EMBODIMENTS

Figure 1:
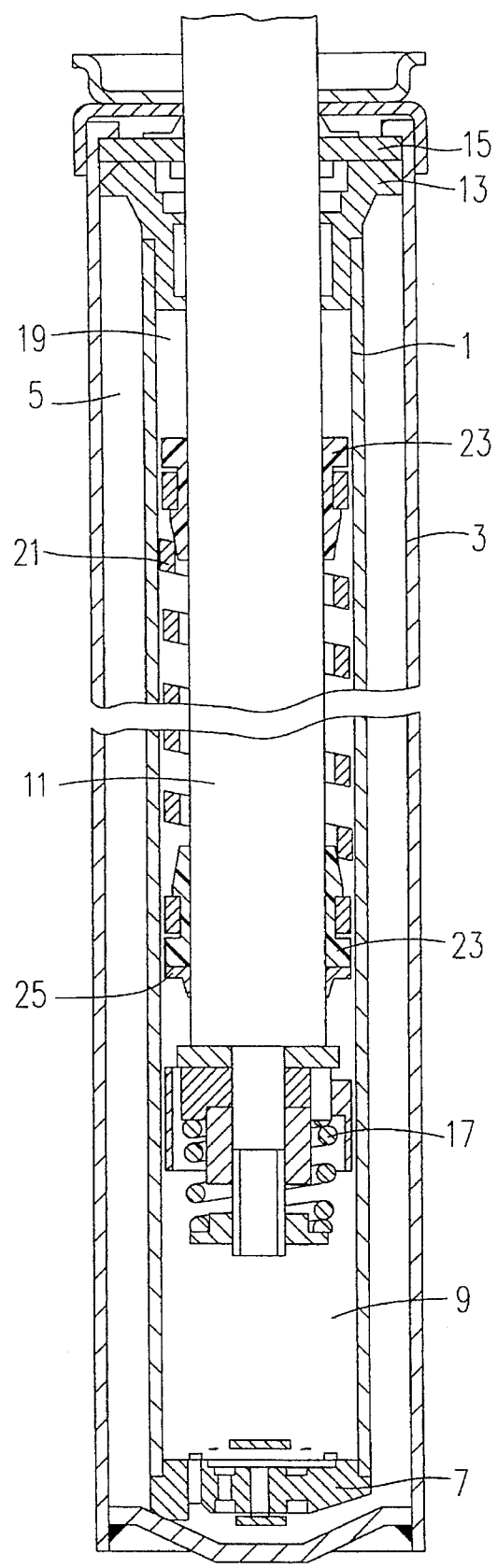
FIG. 1 shows an overall view of a vibration damper.
Figure 1A:
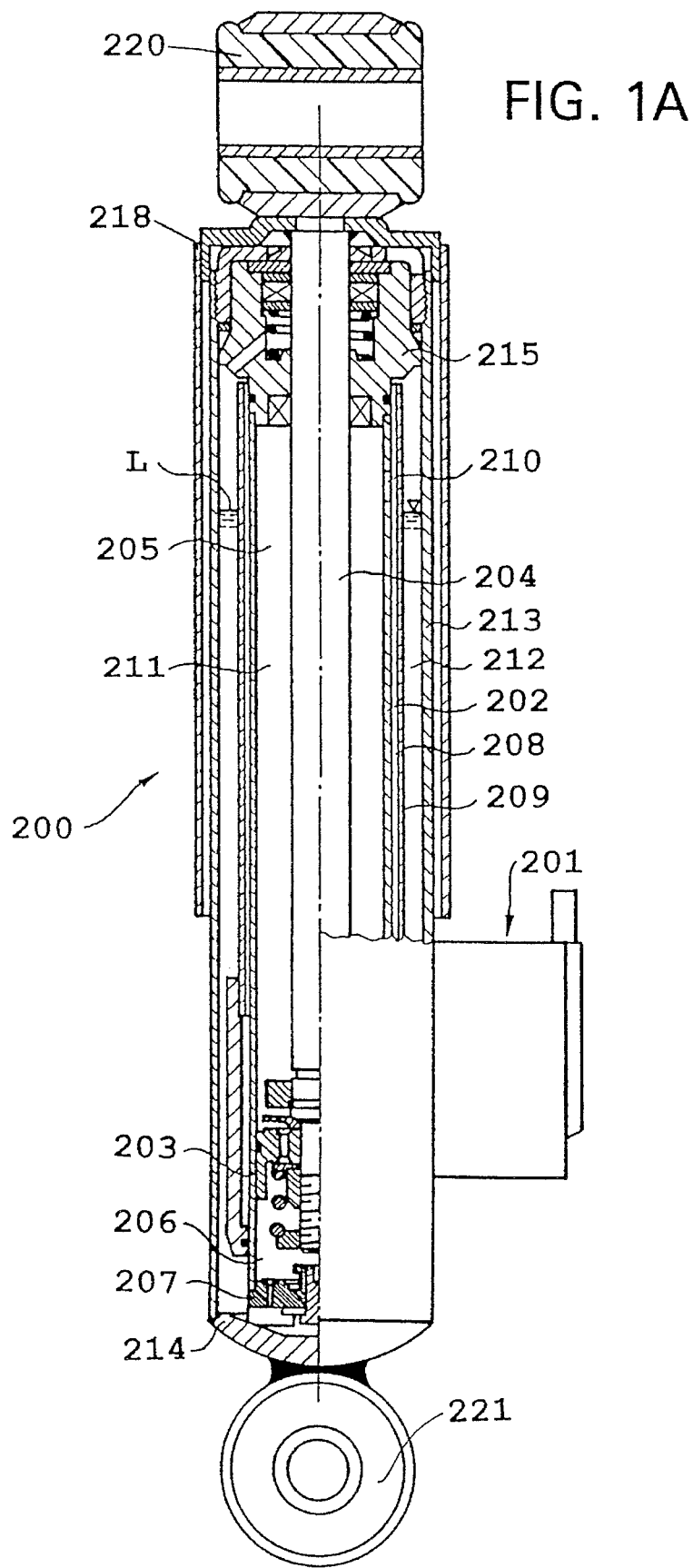
FIG. 1A shows one type of vibration damper for a motor vehicle which may employ the embodiments of the present invention.

FIG. 1A shows a typical shock absorber, or vibration damper unit in which the embodiments of the present invention may conceivably be incorporated. FIG. 1A shows a complete shock absorber or oscillation damper 200, with a fluid bypass valve unit 201, such as is commonly known in the art, and therefore not described in great detail herein. The oscillation damper 200 essentially includes an internal pressure cylinder 202 in which a piston 203 on a piston rod 204 divides a working space 205 into an upper, or piston-rod-side working chamber 211 and a lower, or piston side chamber 206. A bottom valve unit 207 closes the pressure cylinder 202 at the lower end thereof.

A fluid path 208 is formed between the pressure cylinder 202 and an intermediate cylinder 209, wherein the intermediate cylinder 209 is arranged concentrically with respect to the pressure cylinder 202. A connecting orifice 210 in the pressure cylinder 202 connects the upper working chamber 211 with the fluid path 208. A compensating chamber 212 is confined between the intermediate cylinder 209 and a portion of the pressure cylinder 202, on the one hand, and the container cylinder 213 on the other hand. This compensating chamber 212 is axially limited by a base member 214 and a piston rod guiding and sealing unit 215. Both the upper and the lower working chambers can be filled with a liquid. The compensating chamber 212 can also be filled with damping liquid up to the level L, and possibly contains a pressurized gas above the level L.

The piston rod can also be provided with a protective sleeve 218 which can completely surround the container cylinder 213, and can move along with the piston rod 204 to cover the piston rod when the piston rod 204 is drawn out of the damper 200. At the protruding end of the piston rod 204, the piston rod 204 can be provided with an attachment device 220 for attaching the piston rod 204 to a structural member of the automobile, or a suspension member, etc. Similarly, the cylinder portion, i.e., cylinder 213, of the damper 200 can also be provided with an attachment at device 221 for attachment of the cylinder portion relative to the piston rod 204, and thereby providing relative movement therebetween.

The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwardly, a high flow resistance occurs across the piston 203 and a high pressure is generated in the upper working chamber 211. Liquid from the upper working chamber 211 flows, because of the high flow resistance, into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high such that a high pressure occurs within the lower working chamber 206 and also within the upper working chamber 211.

By the connecting orifice 210 and the fluid path 208, the upper working chamber 211 is connected with the compensating chamber 212 via the valve unit 201. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force is reduced.

When the piston rod 204 moves downwardly, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but call also partially escape through the bypass 210, 208, 201 to the compensating chamber 212. Such, the damping force is again reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

Additionally, as further illustrated in FIG. 1, discussed herebelow, the chamber 205 of the embodiment illustrated in FIG. 1a could also be provided with a mechanical damping member to damp, and/or limit movement of the piston rod 204 out of the damper 200.

In essence, all of the components as discussed above with regard to FIG. 1a can be interchangeable with components of the other Figures as discussed hereinbelow.

The vibration absorber illustrated in FIG. 1 is designed as a telescoping strut, and can have a cylinder 1 which can be oriented concentrically within a container tube 3. At least a portion of the interior of the cylinder 1 can preferably define a work chamber 9, and the space between the cylinder 1 and the container tube 3, can preferably be configured as an equalization chamber 5. The equalization chamber 5 can preferably be connected by means of a bottom valve (or dump valve) 7 with the work chamber 9. A piston rod 11 can be guided in a piston rod guide 13, and the cylinder 1 can be externally sealed by means of a piston rod seal 15 disposed about the piston rod 11.

A piston 17 can separate the inside of the cylinder 1 into the work chamber 9, located adjacent one side of the piston 17, and a ring-shaped work chamber 19, located adjacent the other side of the piston 17, and bordered, or limited, by the piston rod 3 and the inside wall of the cylinder 1.

Inside the work chamber 19, there can be a mechanical tension limit stop, which can have a spring 21 and a limit stop, or bearing member, 23 on each end of the spring. In addition to the illustrated spring, which, in the embodiment as illustrated in FIG. 1, has a rectangular cross section, it is naturally possible to use a spring with a round cross section. The tension limit stop 21, 23, as shown in FIG. 1, can preferably be mounted in a floating manner on the piston rod 11, and, once the piston rod 11 has moved a specified telescoping distance, the limit stop 21, 23 can be supported between the piston rod guide 13 and a stop 25 on the piston rod 11.

Figure 2A:
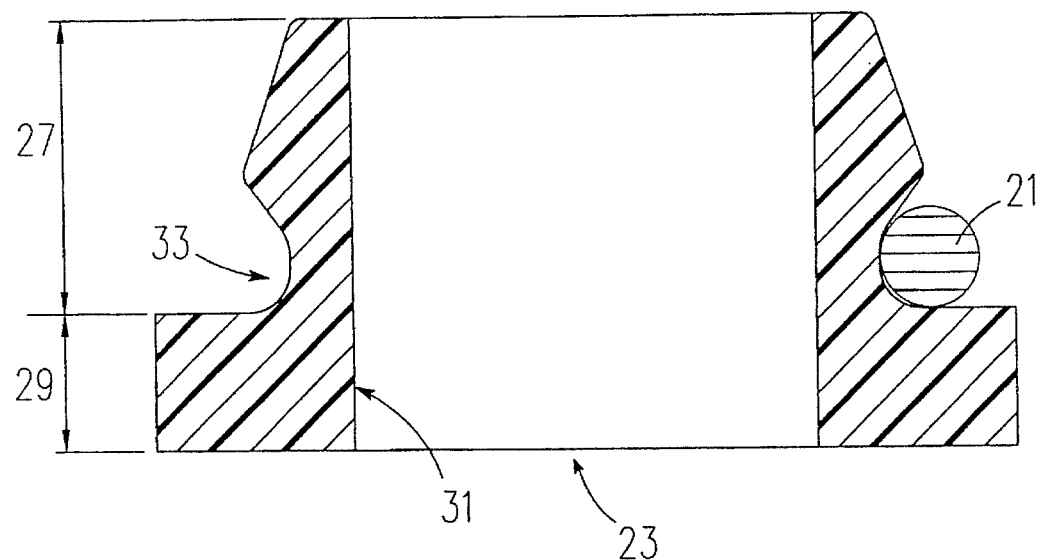
FIGS. 2A and 2B show a limit stop with an undercut for retaining a spring thereon.
Figure 2B:
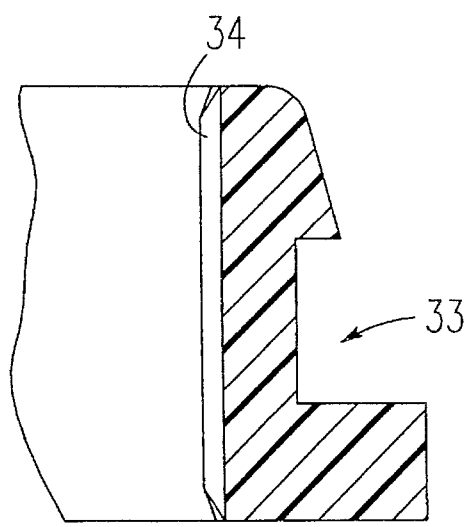

FIGS. 2a and 2b show alternative configurations of a first embodiment of the limit stop 23. In both of these depicted examples, the limit stop 23 essentially has a sleeve 27 and a flange 29. On the inside diameter, the limit stop 23 can preferably be configured with a radial guide surface 31, which can be disposed in sliding contact with the piston rod 11, as shown in FIG. 1). In this variant embodiment, the entire inside diameter essentially represents the guide surface. In the event that sufficient space is available, as depicted in FIG. 2B, axial ribs 34 could also be formed along the inner diameter which ribs can then perform the guide function.

For retaining the spring thereon, the outside diameter of the sleeve 27 can preferably be configured with an undercut 33 in which the spring 21 can be engaged. FIG. 2a shows an undercut for a spring with a round cross section, and FIG. 2b shows an undercut for a spring with a rectangular cross section. In the compression direction, that is, when the spring 21 is being compressed, the spring 21 would be supported by the flange 29, while in the tension direction, or if the spring 21 was being stretched, the spring 21 would be supported by the undercut 33. For use in a shock absorber, or strut, there would essentially not be any strong tension, or stretching forces applied to the spring 21 since the spring 21 is essentially free floating within the chamber 19. Therefore, since there will probably be minimal forces acting to pull the stop 23 off of the spring 21, the undercut 33 can essentially be configured to be sufficiently deep to retain the stop 23 on the end of the spring 21.

While the illustrated limit stop 23 depicted in FIG. 2A may be larger than an actual component, the proportions of the sizes of the various parts thereof could essentially apply to any size limit stop 23. For example, in the depicted drawing of FIG. 2A, the diameter of the undercut 33, could be about 70 mm, while the diameter of the projection immediately above the undercut could be about 80 mm, to thereby provide a ratio of about ⅞. Thus, if a spring 21 was used which had a coil diameter of about 10 mm, there could essentially be about a 5 mm projection overlap on each side for retaining the spring 21 in the undercut 33. Also, the diameter of the flange 29 could be about 104 mm, which can therefore extend beyond a spring 21 disposed in the undercut 33, and provide a bearing surface for the spring 21, and provide a proportionality ratio between the diameter of the undercut 33 and the diameter of the flange 29 of about ⅘. Further, a height of the flange 29 could be about 18 mm, while a height of the entire stop 23 could be about 53 mm, thereby providing a height ratio of about ⅓. An overall height/diameter of flange 29 ratio would then be about ½.

Figure 3A:
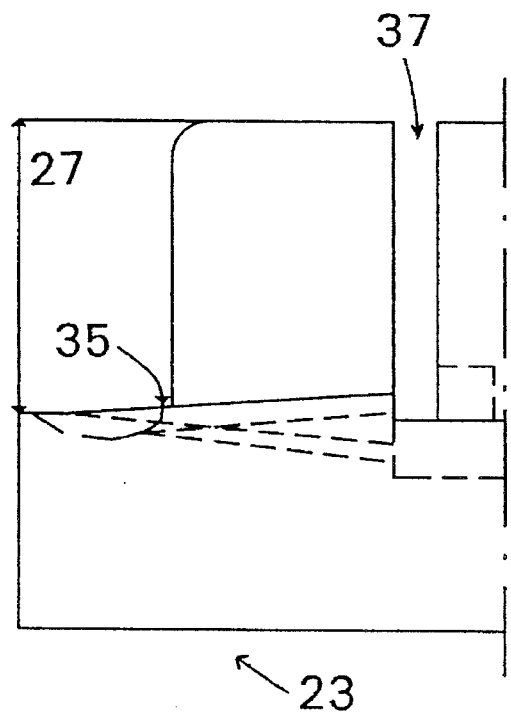
FIG. 3a 3b shows a limit stop which can be force fit with a spring.

FIG. 3a shows an alternative embodiment of a limit stop 23. In this variant, the sleeve can be configured with a slightly conical external contour, so that, if possible, only one terminal coil of the spring 21 is force-fitted to the sleeve 27. Of course, a constant outside diameter can also be selected if several terminal coils of the spring 21 can be used, or if the pitch of the spring is greater than the axial dimension of the sleeve 27, or if the spring has a terminal coil with a reduced inside diameter.

Figure 3B:
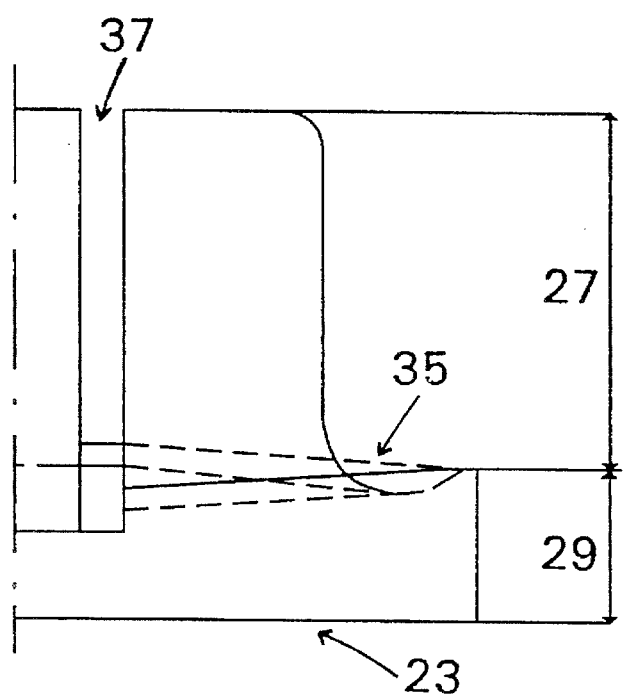

As another example of this variant, FIG. 3b shows that the flange 29, on the side which would face a spring 21, can be equipped with a contour matching a spring 21, which, in the depicted embodiment, would correspond to a round-coil spring. Alternatively, as discussed previously, a rectangular-coil spring could also be used. This contour can essentially be formed in the spring bearing plate 35, and can also have a spiral contour to match an end coil of a spring 21. Consequently and advantageously, there would essentially be no need to tie the ends of the spring. That is, there would be essentially be no need to tie the ends of the spring 21 to the next adjacent coil to form an essentially flat spring end. Alternatively, for a spring which did have tied ends, the spring plate 35 could have a flat contour (not shown, but similar to that as shown in FIGS. 2A and 2B.

If sufficient space is available, for easier installation of the spring, the sleeve can have one or more slots 37, which make possible an elastic deformation of the sleeve 27. Such slots can thereby significantly increase the allowable tolerances for the outside diameter of the sleeve 27, and thus reduce manufacturing costs.

The entire assembly/installation of the mechanical tension limit stop 21, 23 in accordance with the various embodiments of the present invention can be simplified by the fact that the spring 21 has a limit stop 23 on each end. Thus, for installation of this component 21, 23, into the cylinder tube 1, essentially either end of this component 21, 23 can be introduced into the cylinder tube 1 through the piston rod guide end of the cylinder tube 1. The vibration absorber can then be closed off by insertion of the guide 13 and seal 15 into the cylinders 1 and 3.

The use of plastic as the material for the limit stop 23 can essentially reduce the cost of the limit stop 23, while still essentially ensuring that when there is contact between the piston rod 11 and the limit stop 23, no damage will occur to the surface of the piston rod 11, and thus essentially ensuring that no metal chips will be formed.

Moreover, as a result of the sizing of the outside diameter of the flange 29 of the sleeve 27 and of the spring 21, contact with the cylinder 1 can essentially be minimized or substantially completely eliminated. Also, damage during installation and the suspension process can substantially be eliminated. Likewise, as a result of the length of the sleeve 27, which can preferably be several times that of a spring coil of the spring 21, the spring 21 can be prevented from coming into contact with the piston rod 11.

One feature of the invention resides broadly in a vibration absorber or telescoping strut with a mechanical tension limit stop, comprising a cylinder in which a piston which has damping devices and is connected to a piston rod can be moved axially and divides the interior of the cylinder into two fluid-filled work chambers, and on one end of the cylinder there is a guide and a seal for the piston rod, while the hydraulic-mechanical tension limit stop is located in the ring-shaped work chamber between the cylinder and the piston rod, has a limit stop connected to the piston rod, and a spring which is in contact on one hand with the piston rod guide, and on the other hand with the limit stop, characterized by the fact that a limit stop 23, consisting of a sleeve 27 and a flange 29 is connected in a reclosable manner with the spring 21 and by the fact that the sleeve 27 has at least one radial guide surface 31 on its inside diameter for the piston rod 11.

Another feature of the invention resides broadly in the vibration absorber characterized by the fact that the limit stop 23 is made of plastic.

Yet another feature of the invention resides broadly in the vibration absorber characterized by the fact that the sleeve 27 has an undercut 33, in which at least one terminal of the spring 21 is engaged.

Still another feature of the invention resides broadly in the vibration absorber characterized by the fact that the sleeve 27 is force-fitted by means of its outside diameter with the spring 21.

A further feature of the invention resides broadly in the vibration absorber characterized by the fact that the sleeve 27 has at least one longitudinal slot 37, which makes possible a desirable elastic deformation of the sleeve 27 which in turn facilitates the installation of the spring 21.

A still further feature of the invention resides broadly in the vibration absorber characterized by the fact that the outside diameter of the flange 29 of the sleeve 27 is smaller than the inside diameter of the cylinder 1.

Still another further feature of the invention resides broadly in the vibration damper characterized by the fact that the outside diameter of the spring 21 is smaller than the inside diameter of the cylinder 1.

Yet still another feature of the invention resides broadly in the vibration damper characterized by the fact that the axial length of the sleeve 27 is several times the axial length of a spring coil of the spring 21.

Some various alternative embodiments of shock absorbers and shock absorber components which could be interchangeable with the components of the present invention, can be found in the following U.S. Pat. Nos. 3,910,565 which issued to Persicke in October of 1975; and 3.603,574 which issued to Lutz in September of 1971. The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said vibration damper having a longitudinal dimension, and said vibration damper comprising:

tubular member means, said tubular member means having a first end and a second end, and said tubular member means comprising means for attaching said tubular member means to one of:
a wheel suspension of the motor vehicle and a support structure of the motor vehicle;

said tubular member means defining a chamber therewithin, said chamber containing damping fluid therewithin;

piston means disposed within said chamber and dividing said chamber into first and second chamber portions;

said piston means comprising means for controlling flow of damping fluid between said first and second chamber portions;

piston rod means projecting through said first end of said tubular member means, said piston rod means being movable axially within said tubular member means in a direction along the longitudinal dimension of the vibration damper;

said piston rod means having a first end connected to said piston means for movement of said piston means along with said piston rod means;

said piston rod means having a second end disposed opposite said first end, said second end of said piston rod means comprising means for attaching said piston rod means to the other of:
the wheel suspension of the motor vehicle and the support structure of the motor vehicle;

said first end of said tubular member means comprising guide means for guiding movement of said piston rod means during said axial movement of said piston rod means;

said guide means comprising means for at least partially closing said first end of said first and second tubular members;

said piston rod means and said tubular member means defining an annular space therebetween;

resilient member means disposed within said annular space for at least damping movement of said first end of said piston rod means in a direction towards said guide means;

said resilient member means having a first end disposed towards said guide means and a second end disposed towards said piston means;

each of said first and second ends of said resilient member means comprising bearing members for respectively contacting said guide means and said piston means and bearing against said guide means and said piston means during compression of said resilient member means between said guide means and said piston means;

each of said bearing members being mounted to said first and second ends of said resilient member means in a selectively detachable manner;

each said bearing member comprising an annular-shaped member disposed about said piston rod means;

each said bearing member comprising a surface disposed towards and encircling said piston rod means;

said surface of each said bearing member comprising a guide surface for guiding relative movement between said bearing members and said piston rod means;

said resilient member means comprising a cylindrical spring;

said cylindrical spring defining an interior dimension and an exterior dimension;

said cylindrical spring having a first end and a second end;

each said bearing member comprising:
an annular sleeve portion for being disposed about said piston rod means and disposed within said interior dimension of said cylindrical spring; and
an annular flange portion for being disposed about said piston rod means and disposed axially adjacent said first and second ends of said cylindrical spring, said annular flange portion having a diameter greater than the interior dimension of said cylindrical spring.

2. The vibration damper according to claim 1, wherein:

said piston means comprises a piston disposed substantially adjacent said first end of said piston rod means, and a stop member disposed about said piston rod and spaced apart from said piston in a direction towards the second end of said piston rod means;

said stop member being for contacting said bearing member of said cylindrical spring;

said annular sleeve portion comprises said surface encircling said piston rod means;

said first and second ends of said cylindrical spring each comprise a spring portion for being disposed adjacent said annular flange portion;

said annular flange portion comprises a surface disposed axially adjacent said spring portions; and said axially adjacent ones of said spring portions and said surfaces of said annular flange portion comprise complementary contours for matching the contours of one another.

3. The vibration damper according to claim 2, wherein:

each of said bearing members comprises plastic material;

said annular sleeve portion has an outside diameter, and said outside diameter of said annular sleeve portion is force-fit within the interior dimension of said cylindrical spring to provide a connection between said annular sleeve portion and said cylindrical spring in said selectively detachable manner.

4. The vibration damper according to claim 3, wherein:

said connection in said selectively detachable manner is further selectively re-attachable;

said cylindrical spring comprises a coiled spring, said coiled spring having at least a first end coil at the first end thereof, a second end coil at the second end thereof, and at least two coils disposed between said first and second end coils;

each of said first and second end coils define a first interior diameter of said coiled spring;

said annular sleeve portion comprises a first end disposed adjacent said annular flange portion and a second end disposed away from said first end;

said annular sleeve portion further comprises a first part disposed adjacent said first end and a second part disposed adjacent said second end;

each of said first part and said second part have a diameter; and said diameter of said first part being substantially the same as the first interior diameter of the first and second end coils, and said diameter of said second part being greater than the diameter of the first part to provide a further flange for retaining at least a corresponding one of the first and second end coils about the first part of the annular sleeve portion.

5. The vibration damper according to claim 4, wherein:

said annular sleeve portion has a surface disposed radially outwardly adjacent a corresponding one of said first and second end coils of said coiled spring;

at least said first and second end coils have a radially inwardly disposed contour;

said radially outwardly disposed surface of said annular sleeve portion has a contour corresponding to the radially inwardly disposed contour of said first and second end coils.

6. The vibration damper according to claim 3, wherein:

said cylindrical spring comprises a coiled spring, said coiled spring having at least a first end coil at the first end thereof, a second end coil at the second end thereof, and at least two coils disposed between said first and second end coils;

each of said first and second end coils define a first interior diameter of said coiled spring;

said annular sleeve portion comprises a first end disposed adjacent said annular flange portion and a second end disposed away from said first end;

said annular sleeve portion further comprises a first part disposed adjacent said first end and a second part disposed adjacent said second end;

each of said first part and said second part have a diameter; and said diameter of said first part being substantially the same as the first interior diameter of the first and second end coils, and said diameter of said second part being greater than the diameter of the first part to provide a further flange for retaining at least a corresponding one of the first and second end coils about the first part of the annular sleeve portion;

said annular sleeve portion comprises at least one longitudinal slot disposed from at least the first end of said annular sleeve portion to said second end of said annular sleeve portion for allowing radial deformation of at least said second part of said annular sleeve portion to reduce the diameter of at least said second part of said annular sleeve portion for installation of said annular sleeve portion within said coiled spring.

7. The vibration damper according to claim 6, wherein:

said tubular member means comprises a first cylinder defining said chamber, and a second cylinder disposed circumferentially about said first cylinder, said second cylinder defining an expansion chamber between said first and second cylinders, and said second cylinder comprising said means for attaching said tubular member means;

said first cylinder defines an interior diameter;

said diameter of said annular flange portion being less than the interior diameter of said first cylinder;

said coiled spring defines an outside diameter, said outside diameter of said coiled spring being less than the interior diameter of said first cylinder;

said annular sleeve portion has an axial length;

each said coil of said coiled spring has an axial length;

said axial length of said annular sleeve portion is at least twice the axial length of each said coil;

said coiled spring with said bearing members is disposed within said annular space in a freely movable manner with said coiled spring with said bearing members being freely movable about said piston rod means in a direction along said longitudinal dimension of said vibration damper between said guide means and said stop member;

said annular sleeve portion has a conical taper from said first end of said annular sleeve portion to said second end of said annular sleeve portion;

said annular sleeve portion has a surface disposed radially outwardly adjacent a corresponding one of said first and second end coils of said coiled spring;

at least said first and second end coils have a radially inwardly disposed contour;

said radially outwardly disposed surface of said annular sleeve portion has a contour corresponding to the radially inwardly disposed contour of said first and second end coils;

said first and second end coils of said coiled spring comprise helical coils;

said surface of said annular flange portion disposed axially adjacent said end coils comprises a helical contour corresponding to said helical end coils; and said cylindrical surface encircling said piston rod means comprises a plurality of axially disposed ridges spaced about said cylindrical surface.

8. The vibration damper according to claim 5, wherein:

said tubular member means comprises a first cylinder defining said chamber, and a second cylinder disposed circumferentially about said first cylinder, said second cylinder defining an expansion chamber between said first and second cylinders, and said second cylinder comprising said means for attaching said tubular member means;

said first cylinder defines an interior diameter;

said diameter of said annular flange portion being less than the interior diameter of said first cylinder;

said coiled spring defines an outside diameter, said outside diameter of said coiled spring being less than the interior diameter of said first cylinder; and said cylindrical surface encircling said piston rod means comprises a plurality of axially disposed ridges spaced about said cylindrical surface.

9. A vibration damper for motor vehicles, said vibration damper having a longitudinal dimension, and said vibration damper comprising:

tubular member means, said tubular member means having a first end and a second end, and said tubular member means comprising means for attaching said tubular member means to one of:
a wheel suspension of the motor vehicle and a support structure of the motor vehicle;

said tubular member means defining a chamber therewithin, said chamber containing damping fluid therewithin;

piston means disposed within said chamber and dividing said chamber into first and second chamber portions;

said piston means comprising means for controlling flow of damping fluid between said first and second chamber portions;

piston rod means projecting through said first end of said tubular member means, said piston rod means being movable axially within said tubular member means in a direction along the longitudinal dimension of the vibration damper;

said piston rod means having a first end connected to said piston means for movement of said piston means along with said piston rod means;

said piston rod means having a second end disposed opposite said first end, said second end of said piston rod means comprising means for attaching said piston rod means to the other of:
the wheel suspension of the motor vehicle and the support structure of the motor vehicle;

said first end of said tubular member means comprising guide member means for guiding movement of said piston rod means during said axial movement of said piston rod means;

said guide member means comprising means for at least partially closing said first end of said first and second tubular members;

said piston rod means and said tubular member means defining an annular space therebetween;

resilient member means disposed within said annular space for at least damping movement of said first end of said piston rod means in a direction towards said guide member means;

said resilient member means having a first end disposed towards said guide member means and a second end disposed towards said piston means;

each of said first and second ends of said resilient member means comprising guide means for guiding relative movement between said resilient member means and said piston rod;

each of said guide means comprising at least one guide surface disposed adjacent said piston rod;

said resilient member means with said guide means being disposed within said annular space in a freely movable manner with said resilient member means with said guide means being freely movable about said piston rod means in a direction along said longitudinal dimension of said vibration damper between said guide member means and said piston means;

said resilient member means comprising a cylindrical spring;

each of said guide means comprising annular shaped members disposed about said piston rod means;

each said at least one guide surface comprising a cylindrical surface disposed towards and encircling said piston rod means;

said cylindrical spring defining an interior dimension and an exterior dimension;

said cylindrical spring having a first end and a second end;

each said guide means comprising:
an annular sleeve portion for being disposed about said piston rod means and disposed within said interior dimension of said cylindrical spring; and
an annular flange portion, extending from said annular sleeve portion, for being disposed axially adjacent said first and second ends of said cylindrical spring, said annular flange portion having an outside diameter, and said outside diameter of said annular flange portion being greater than the interior dimension of said cylindrical spring.

10. The vibration damper according to claim 9, wherein:

said annular sleeve portion comprises said cylindrical surface encircling said piston rod means;

said first and second ends of said cylindrical spring each comprise a spring portion for being disposed axially adjacent said annular flange portion;

said annular flange portion comprises a surface disposed axially adjacent said spring portions; and said axially adjacent spring portions and surfaces of said annular flange portion comprise complementary contours for matching the contours of one another.

11. The vibration damper according to claim 10, wherein:

said annular sleeve portion has an outside diameter, and said outside diameter of said annular sleeve portion is force-fit within the interior dimension of said cylindrical spring to provide a selectively detachable connection between said annular sleeve portion and said cylindrical spring.

12. The vibration damper according to claim 11, wherein:

said cylindrical spring comprises a coiled spring, said coiled spring having at least a first end coil at the first end thereof, a second end coil at the second end thereof, and at least two coils disposed between said first and second end coils;

each of said first and second end coils define a first interior diameter of said coiled spring;

said annular sleeve portion comprises a first end disposed adjacent said annular flange portion and a second end disposed away from said first end;

said annular sleeve portion further comprises a first part disposed adjacent said first end and a second part disposed adjacent said second end;

each of said first part and said second part have a diameter;

said diameter of said first part being substantially the same as the first diameter of the first and second end coils of said coiled spring, and said diameter of said second part being greater than the diameter of the first part to provide a further flange for retaining at least a corresponding one of the first and second end coils about the first part of the annular sleeve portion.

13. The vibration damper according to claim 11, wherein:

said cylindrical spring comprises a coiled spring, said coiled spring having at least a first end coil at the first end thereof, a second end coil at the second end thereof, and at least two coils disposed between said first and second end coils;

each of said first and second end coils define a first interior diameter of said coiled spring;

said annular sleeve portion comprises a first end disposed adjacent said annular flange portion and a second end disposed away from said first end;

said annular sleeve portion further comprises a first part disposed adjacent said first end and a second part disposed adjacent said second end;

each of said first part and said second part have a diameter;

said diameter of said first part being substantially the same as the first diameter of the first and second end coils of said coiled spring, and said diameter of said second part being greater than the diameter of the first part to provide a further flange for retaining at least a corresponding one of the first and second end coils about the first part of the annular sleeve portion;

said annular sleeve portion comprises at least one longitudinal slot disposed from at least the first end of said annular sleeve portion to said second end of said annular sleeve portion for allowing radial deformation of at least said second part of said annular sleeve portion to reduce the diameter of at least the second part of said annular sleeve portion for installation of said annular sleeve portion within said coiled spring.

14. The vibration damper according to claim 12, wherein:

said annular sleeve portion has a surface disposed radially outwardly adjacent a corresponding one of said first and second end coils of said coiled spring;

at least said first and second end coils have a contour on a radially inward side thereof; and said radially outwardly disposed surface of said annular sleeve portion has a contour corresponding to the radially inwardly disposed contour of said first and second end coils.

15. The vibration damper according to claim 14, wherein:

said cylindrical surface encircling said piston rod means comprises a plurality of axially disposed ridges spaced about said cylindrical surface;

each said guide means comprises plastic;

said vibration damper further comprises:
  a fluid communication passage between said chamber of said first cylinder and said expansion chamber between said first and second cylinders;

valve means for controlling fluid flow through said fluid communication passage;

said piston means comprises a piston disposed at the first end of said piston rod means, and a stop ring disposed spaced apart from said piston towards said second end of said piston rod means;

said coiled spring with said guide means at said first and second ends thereof being freely movable within said annular chamber between said stop ring and said guide member means; and said guide member means further comprises sealing means for sealing about the piston rod.

16. The vibration damper according to claim 15, wherein:

said tubular member means comprises a first cylinder defining said chamber, and a second cylinder disposed circumferentially about said first cylinder, said second cylinder defining an expansion chamber between said first and second cylinders, and said second cylinder comprising said means for attaching said tubular member means;

said first cylinder defines an interior diameter;

said outside diameter of said annular flange portion is less than the interior diameter of said first cylinder;

said coiled spring defines an outside diameter, said outside diameter of said coiled spring being less than the interior diameter of said first cylinder;

said annular sleeve portion has an axial length;

each said coil of said coiled spring has an axial length;

said axial length of said annular sleeve portion is at least twice the axial length of a coil;

said annular sleeve portion has a conical taper from said first end of said annular sleeve portion to said second end of said annular sleeve portion;

said first and second end coils of said coiled spring comprise helical coils; and said surface of said annular flange portion disposed axially adjacent said spring portions comprises a helical contour corresponding to said helical end coils.

* * * * *

UNITED STATES PATENT AND TRADEMARK OFFICE
CERTIFICATE OF CORRECTION

PATENT NO. : 5,501,438
DATED : March 26, 1996
INVENTOR(S) : Günther HANDKE, Edward W. SILYE, Toivo RAABIS, Thomas ACHARD, and Matthias RAULF It is certified that error appears in the above-indentified patent and that said Letters Patent is hereby corrected as shown below:

In column 4, line 45, before 'a limit', delete "FIG. 3a 3b shows" and insert --FIGS. 3a and 3b show--.

In column 6, line 14, after 'but', delete "call" and insert --can--.

In column 7, line 7, after 'FIG.', delete " 1)." and insert --1.--.

In column 9, line 21, after '1971.' insert the following paragraphs:

Signed and Sealed this

Eighteenth Day of March, 1997

Attest:

BRUCE LEHMAN

Attesting Officer  Commissioner of Patents and Trademarks